(12) United States Patent
Sun et al.

(10) Patent No.: US 9,048,722 B2
(45) Date of Patent: Jun. 2, 2015

(54) CURRENT EQUALIZING BUSBAR

(71) Applicant: DELTA ELECTRONICS, INC., Taoyuan Hsien (TW)

(72) Inventors: Zongyu Sun, Taoyuan Hsien (TW); Jun Chen, Taoyuan Hsien (TW); Teng Xu, Taoyuan Hsien (TW); Lin Liu, Taoyuan Hsien (TW); Jingxian Kuang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 149 days.

(21) Appl. No.: 13/970,067

(22) Filed: Aug. 19, 2013

(65) Prior Publication Data

US 2014/0362627 A1    Dec. 11, 2014

(30) Foreign Application Priority Data

Jun. 7, 2013    (CN) .......................... 2013 1 0228230

(51) Int. Cl.
| | |
|---|---|
| *H01F 38/00* | (2006.01) |
| *H02M 7/00* | (2006.01) |
| *H02G 5/00* | (2006.01) |
| *H02M 7/493* | (2007.01) |

(52) U.S. Cl.
CPC ............... *H02M 7/003* (2013.01); *H02G 5/005* (2013.01); *H02M 7/493* (2013.01)

(58) Field of Classification Search
CPC ......... H02J 3/383; H02J 1/102; H02M 3/158; H02M 7/003; H03F 1/14
USPC ......... 307/10.1, 83, 91; 363/17, 65, 126, 137, 363/144, 56.01
See application file for complete search history.

(56) References Cited

U.S. PATENT DOCUMENTS

| | | | |
|---|---|---|---|
| 4,876,634 A * | 10/1989 | Paice ................................. | 363/5 |
| 5,521,809 A * | 5/1996 | Ashley et al. .................... | 363/71 |
| 8,488,354 B2 * | 7/2013 | Swamy .......................... | 363/126 |
| 8,872,384 B2 * | 10/2014 | Stratakos et al. ............. | 307/104 |

* cited by examiner

*Primary Examiner* — Rajnikant Patel
(74) *Attorney, Agent, or Firm* — Tim Tingkang Xia, Esq.; Morris, Manning & Martin, LLP

(57) ABSTRACT

The present application discloses a current equalizing busbar for a converter comprising: a direct current busbar connected to a DC terminal of the converter and positive terminals and negative terminals of respective power modules; and an alternate current busbar connected to AC terminals of the respective power modules and a load; wherein, when the converter operates, a sum of an inductance caused by the DC busbar between the DC terminal and a positive terminal or a negative terminal of a power module and an inductance caused by the AC busbar between the load and an AC terminal of the power module is equal to a sum of an inductance caused by the DC busbar between the DC terminal and positive terminals or negative terminals of other power modules and an inductance caused by the AC busbar between the load and AC terminals of said other power modules.

10 Claims, 10 Drawing Sheets

CURRENT EQUALIZING BUSBAR

CROSS REFERENCE TO RELATED APPLICATIONS

The present application claims priority under 35 U.S.C. §119 to Chinese Patent Application No. 201310228230.9, filed on Jun. 7, 2013, the entire content of which is incorporated herein by reference.

TECHNICAL FIELD

The present application relates to a busbar arrangement, and more particularly to a current equalizing busbar for a converter.

BACKGROUND ART

Wind energy as a kind of clean, non-polluting and renewable energy attracts considerable attention. After many years developing, the proportion of wind power is increasing year by year, while the capacity of a single wind generator gets bigger and bigger. The capacity of a converter being as a main component of a wind generator increases rapidly, for example, the capacity of foreign mainstream models from 500~1000 KW in 2000 year to 2~3 MW in 2009 year, currently being developed to 8~10 MW; the capacity of domestic mainstream models from 600~1000 KW in 2005 to 850~2000 KW in 2009, currently being developed to 6 MW.

Typically, a converter includes a rectifier circuit and an inverter circuit. In the inverter circuit or the rectifier circuit, it is required to perform an inverting conversion from a direct current (DC) to an alternative current (AC), or a rectifying conversion from an AC to a DC, so as to output an AC or a DC. As the capacity of a single converter increases, it is required to increase the capacity of power modules (power stack) constituted by large power components. Therefore, due to cost and semiconductor device manufacturing process level, it requires that power components (for example, IGBTs, i.e., Insulated Gate Bipolar Transistors) are used in parallel to meet the design output requirements.

For parallelling IGBTs, an important issue is how to equalizing current among the components. Good current equalizing can improve component utilization and save cost, as well as improve system reliability. How to design AC busbars and DC busbars for parallelled IGBTs critically affects the current equalizing, and the smaller the parasitic inductance of each parallel branch is, the better current equalizing effect is.

As shown in FIG. 1, in a conventional arrangement manner, AC busbars and DC busbars are disposed symmetrically, wherein power modules 1 and 2 are connected in parallel, positive and negative DC terminals of the power module 1 and the power modules 2 are connected to DC terminals (for example, the positive and negative terminals of a bus capacitor C) via the DC busbar, and AC terminals of the power modules 1 and 2 are connected to a load (not shown in FIG. 1) via the AC busbars. In FIG. 1, L1, L2, L4 and L5 represent parasitic inductances of the DC busbars, and L3 and L6 represent parasitic inductances of the AC busbars. By way of the arrangement of FIG. 1, it can be realized that L1+L2=L4+L5 and L3=L6, thereby obtaining a good current equalizing. However, this arrangement manner requires symmetrically design of AC busbars, resulting in large size and high cost of copper busbars and high requirement for line-feeding manner of the copper busbars. In addition, it is difficult to install these symmetrical copper busbars, which does not facilitate system design.

Another traditional arrangement manner is shown in FIG. 2. In the arrangement shown in FIG. 2, an AC busbar as a common AC busbar is directly connected to AC terminals of the IGBTs, without considering whether L3 and L6 are equal. A whole assembly of AC busbars and DC busbars in FIG. 2 is shown in FIG. 3, where arrows indicate inflow directions of current. As shown in FIG. 3, a DC busbar 3 is respectively connected to the positive or negative DC terminals of the power module 1 and the power module 2, and an AC busbar 4 is connected to the AC terminals of the power modules 1 and 2 and a load (not shown in FIG. 2), wherein a parasitic inductance of the AC busbar 4 between the power modules 1 and 2 in FIG. 3 can be equivalent to L6 in FIG. 2, a parasitic inductance of the AC busbar 4 between the AC output terminal of the power module 1 and the load is equivalent to L3 in FIG. 2. From FIG. 2 and FIG. 3, it can be seen that, although this design is simple and the installation is relatively easy in comparison with the previously mentioned manner, the parasitic inductances caused by the AC busbar with respect to power modules 1 and 2 are different, resulting in a dissatisfactory current equalizing effect.

Therefore, the arrangements in the prior art either have a simple structure while having a poor current equalizing effect, or have a good current equalizing effect while having a complicated design, large volume and stiff line-feeding manner, and thus affecting the overall system design.

DISCLOSURE OF THE INVENTION

In view of the above problems, the present application provides a current equalizing busbar arrangement, which can achieve good current equalizing effect, has a simple design, and facilitates to system design.

According to an embodiment of the present application, a current equalizing busbar for a converter of the present application comprises: a direct current busbar connected to a DC terminal of the converter and positive terminals and negative terminals of respective power modules in the converter, through which a DC power is applied to the respective power modules in the converter; and an alternate current busbar connected to AC terminals of the respective power modules in the converter and a load; wherein, when the converter operates, a sum of an inductance caused by the DC busbar between the DC terminal and a positive terminal or a negative terminal of a power module in the converter and an inductance caused by the AC busbar between the load and an AC terminal of the power module is equal to a sum of an inductance caused by the DC busbar between the DC terminal and positive terminals or negative terminals of other power modules and an inductance caused by the AC busbar between the load and AC terminals of said other power module.

Although the current equalizing busbars according to the present application have a simple structure, a good current equalizing effect can be obtained, and the current equalizing busbars of the present application have a high reliability, and facilitate to system design. Thus, the current equalizing busbars of the present application may be widely applied to large power converters.

These and other aspects of the present application will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the application together with the written description, and serve to explain the principle of the application. Wherever possible, the same reference numbers are used throughout the drawings to refer to the same or like elements of embodiments, and wherein.

DETAILED DESCRIPTION OF THE PREFERRED EMBODIMENTS

Figure 1:
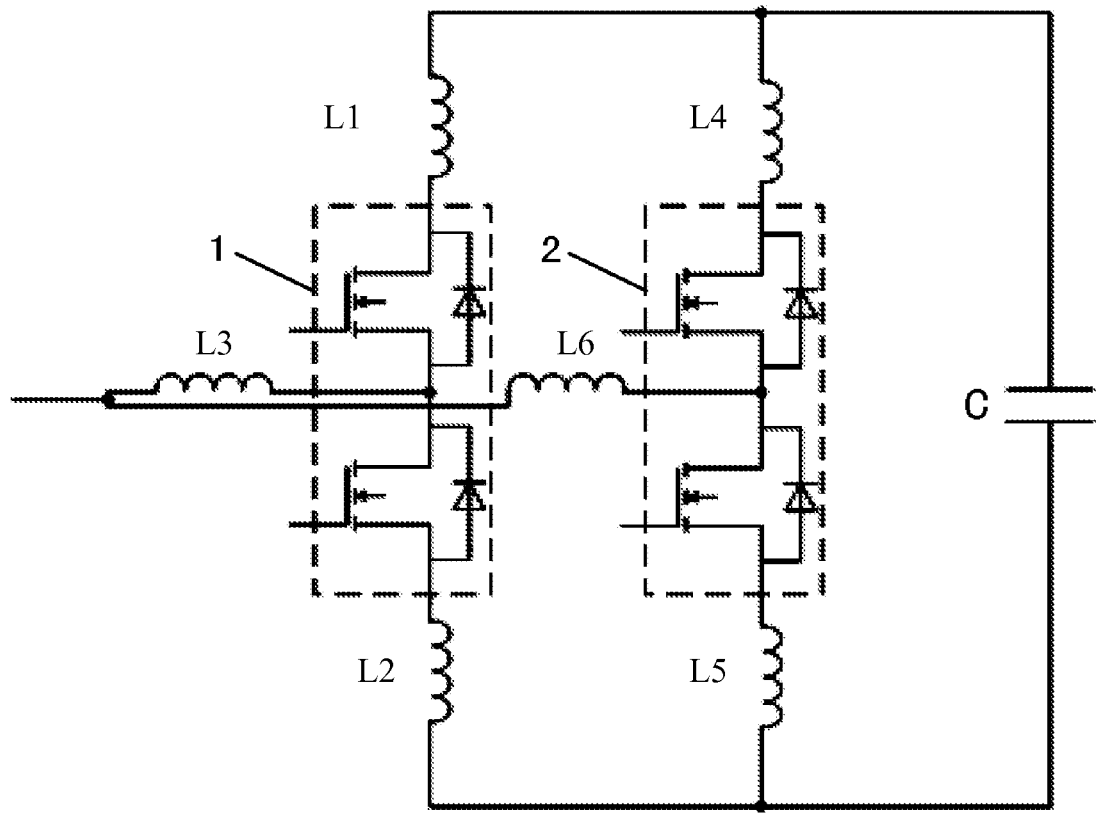
FIG. 1 is a diagram showing an equivalent circuit of DC busbars and AC busbars for a converter in the prior art.

Hereinafter, embodiments of the present application are described in detail. It should be noted that the embodiments are only illustrative, not intend to limit the present application.

The present application will now be described more fully hereinafter with reference to the accompanying drawings, in which exemplary embodiments of the application are shown. This application may, however, be embodied in many different forms and should not be construed as limited to the embodiments set forth herein. Rather, these embodiments are provided so that this disclosure will be thorough and complete, and will fully convey the scope of the application to those skilled in the art. Like reference numerals refer to like elements throughout the context.

The terminology used herein is for the purpose of describing particular embodiments only and is not intended to limit the application. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and the present disclosure, and will not be interpreted in an idealized or overly formal sense, besides expressly so defined herein.

The present application considers the current equalizing influence of DC busbars and AC busbars as a whole on power component modules in a converter, rather than respectively considering the current equalizing influence of a respective DC busbar or AC busbar on power component modules. The concept of the present application is to design the arrangement of DC busbars and AC busbars in an asymmetrical manner, such that the parasitic inductances with respect to power modules caused by the DC busbars are complementary to the parasitic inductances with respect to the power modules caused by the AC busbars, which may achieve a good current equalizing effect.

Figure 4:
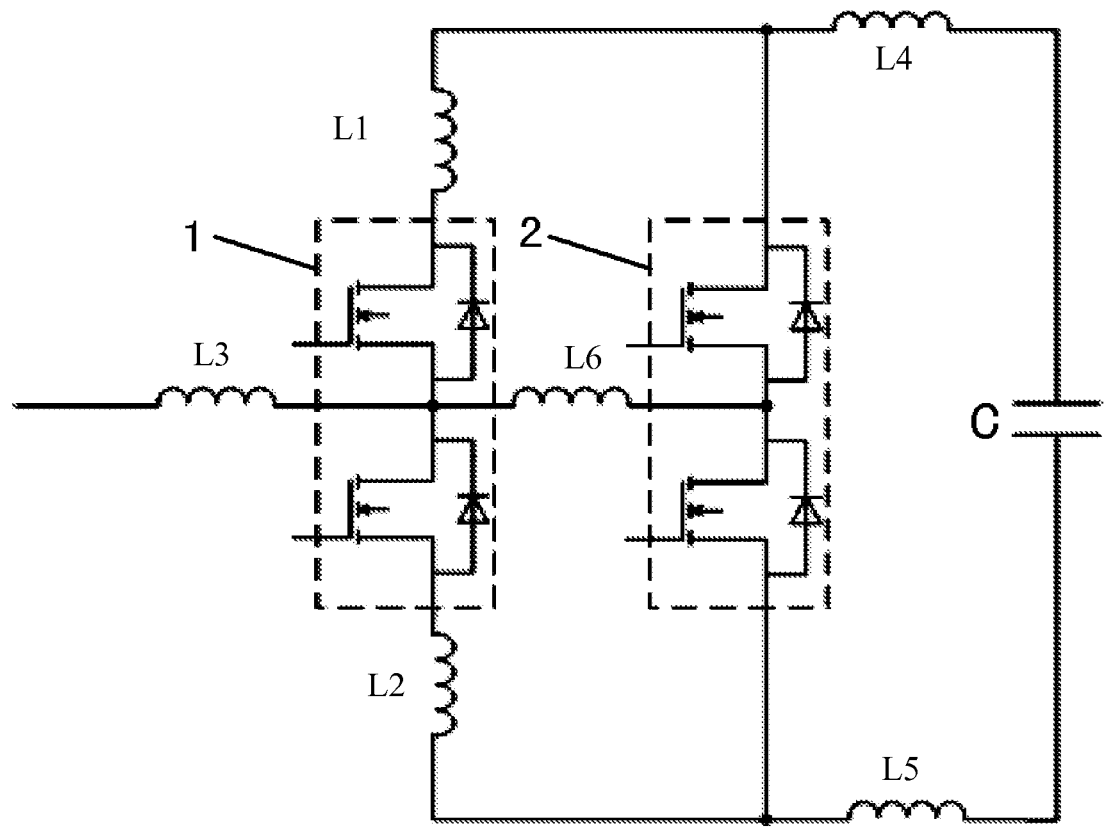
FIG. 4 is a diagram showing an equivalent circuit of a current equalizing busbar arrangement for a converter according to an embodiment of the present application.

FIG. 4 is a diagram showing an equivalent circuit of a current equalizing busbar arrangement for a converter according to an embodiment of the present application. As an example of this embodiment, one side of a DC busbar is connected to a DC terminal, for example, a positive or negative terminal of a bus capacitance C or a positive or negative terminal of a DC source, another side of the DC busbar is connected to positive terminals and negative terminals of respective power modules in the converter, and an AC busbar is connected to AC terminals of the power modules in the converter and a load. The converter functions as inverting a DC into an AC or rectifying an AC into a DC. When the converter is used as an inverter that inverts a DC into an AC, a side of the DC busbar illustrated in this example may be connected to a DC terminal, for example, a positive or negative terminal of a bus capacitance C or a positive or negative terminal of a DC source, through the DC busbar a power is applied to respective power modules in the converter, and the AC busbar output a current from AC terminals of the respective power modules in the converter to a load (not shown in FIG. 4). When the converter is used as a rectifier that rectifies an AC into a DC, the AC busbar illustrated in this example may accept an alternate current from outside, and the DC busbar may output a direct current rectified by the power modules.

Figure 3:
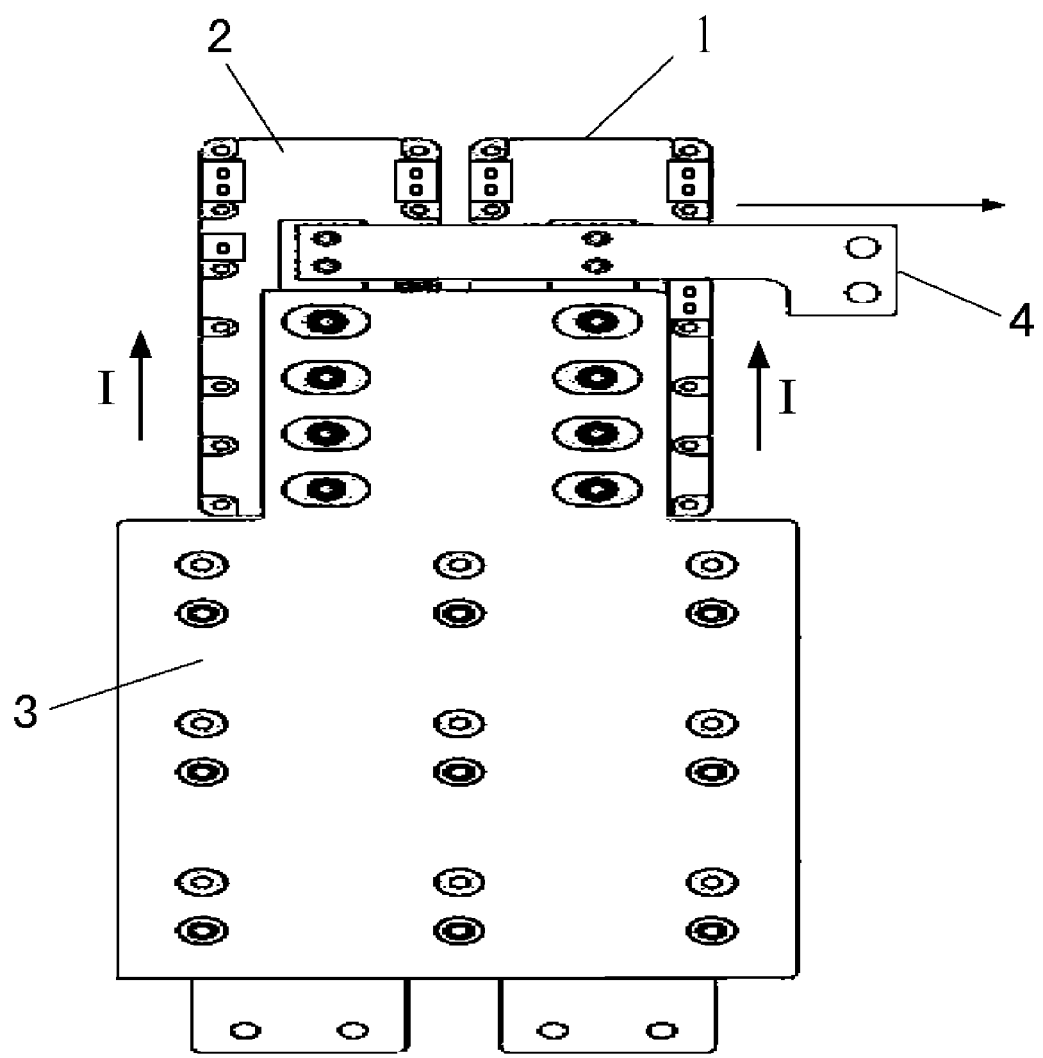
FIG. 3 is a schematic diagram showing a wholly assembly of a DC busbar and a AC busbar in the FIG. 2.

Herein, each of the power modules comprises a upper-arm power component and a lower-arm power component. Although only two power modules 1 and 2 are shown in FIG. 3, those skilled in the art should understand that the number of the power modules is not limited to this, and according to the design requirement of circuit, for example, the converter may comprises three, four or more power modules.

In the present application, the distances from a connection terminal of the DC busbar (referred to as a DC input terminal or a DC output terminal, hereafter short for a DC terminal) to DC connection terminals (positive terminals or negative terminals) of the respective power modules are not equal to each other; and the distances from a connection terminal of the AC busbar for respective power modules (may be an AC output terminal or an AC input terminal) to the AC connection terminals of the respective power modules (AC terminals of power modules) are also not equal to each other. Such unequivalent distances make the current imbalance caused by the AC busbar and the current imbalance caused by the DC busbar counteract, thereby achieving the current equalizing effect.

That is, in order to achieve a good current equalizing effect, when the converter operates, a sum of a parasitic inductance caused by a DC busbar between a DC terminal thereof and a positive terminal or negative terminal of a power module in the converter and a parasitic inductance caused by a AC busbar between a load and an AC terminal of the power module is substantially equal to a sum of a parasitic inductance caused by the DC busbar between the DC terminal thereof and positive terminals or negative terminals of other power modules in the converter and a parasitic inductance caused by the AC busbar between the load and AC terminals of other power modules. That is, when the converter operates, since there are different parasitic inductances, the current influence of the DC busbar and the AC busbar on one of the power modules may be substantially equal to the current influence of the DC busbar and the AC busbar on other power modules, thereby achieving good current equalizing effect between respective modules.

For ease of illustration, the following embodiment takes a example that when a converter operates as an inverter, i.e., a DC busbar is connected to a DC source and a AC busbar outputs an alternate current, to explain the current equalizing effect which the current equalizing busbars of the present application can achieve. Those skilled in the art should understand that the current equalizing busbar arrangement can also achieve the same current equalizing when the converter operates as a rectifier.

Taking a power module constituted by two power IGBTs connected in parallel for example, as shown in FIG. 4, the current imbalance brought by the AC busbar counteracts the current imbalance brought by the DC busbar. Particularly, since the parasitic inductance plays a major role in equalizing current for the IGBTs connected in parallel receiving the same driving signals, therefore, if the converter operates as an inverter, with respect to an AC output terminal, the output parasitic inductance of the power module 1 is equal to L3, and the output parasitic inductance of the power module 2 is equal to L3+L6 (which comprises an output parasitic inductance L3 of the power module 1 as a common part), thereby inevatiblly making the output current of the power module 1 smaller than that of the power module 2. In order to achieve the effect of counteracting each other, with respect to a DC supply terminal, an input parasitic inductance of the power module 2 is smaller than that of the power module 1, that is, the input parasitic inductance of the power module 1 is equal to L1+L2+L4+L5, and the input parasitic inductance of the power module 2 is equal to L4+L5. As a result of the existance of L1 and L2, it makes the current through the power module 1 smaller than that through the power module 2, thus the output current of the power module 2 is smaller than the output current of the power module 1. Taken as a whole, assuming that the upper arms of the power modules 1 and 2 are on, the parasitic inductance in the branch of the power module 1 (comprising the parasitic inductances with respect to the power module 1 caused by the DC busbar and the AC busbar, respectively) is the sum of L1, L4 and L3, and the parasitic inductance in the branch of the power module 2 (comprising the parasitic inductances with respect to the power module 2 caused by the DC busbar and the AC, respectively) is the sum of L3, L6 and L4. In this case, since the current distributed in a paralled branch decreases as the parasitic inductance of the branch increases, the desired effect of current equalizing can be achieved when the influence of L6 on current and the influence of L1 on current counteract each other. Meanwhile, assuming that the lower arms of the power modules 1 and 2 are on, the parasitic inductance in the branch in which the power module 1 is located is the sum of L2, L5 and L3, and the parasitic inductance in the branch in which the power module 2 is located is the sum of L3, L6 and L5. In the case, also since the current distributed in a parallel branch decreases as the parasitic inductance of the branch increases, the desired effect of current equalizing can also be achieved when the influence of L6 on current and the influence of L2 on current counteract each other.

Figure 8:
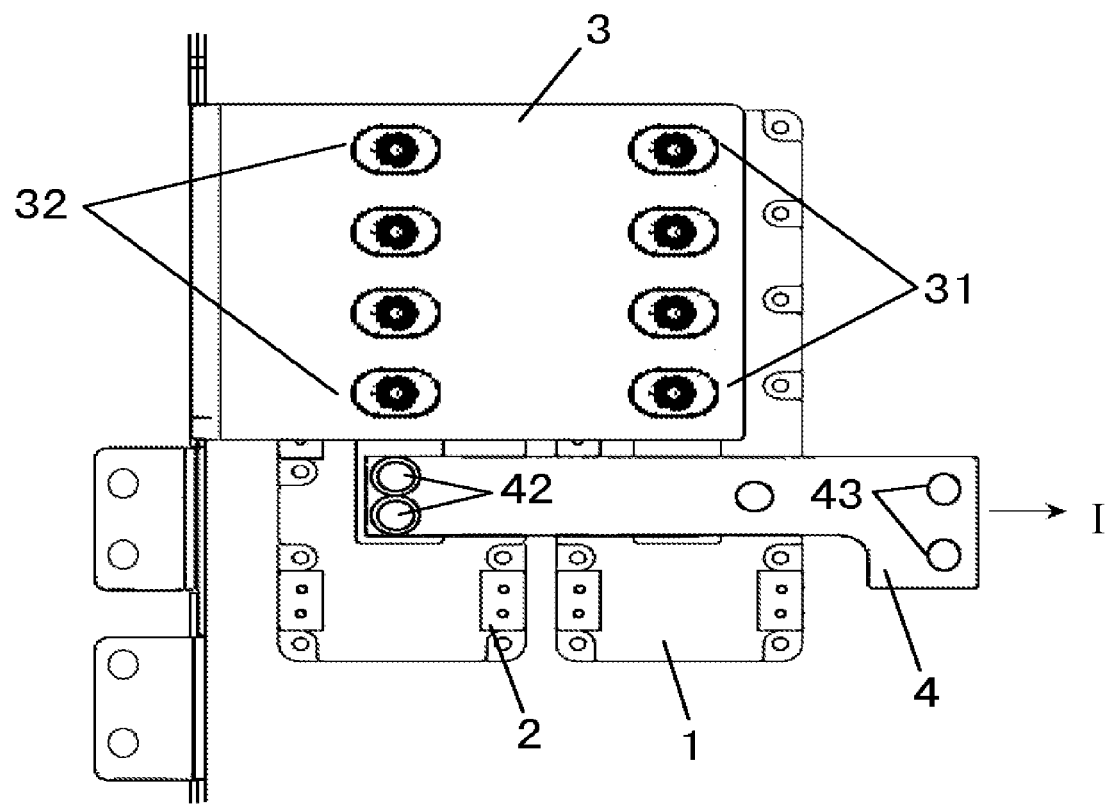
FIG. 8 is a schematic diagram showing a wholly assembly of current equalizing busbars according to an embodiment of the present application.

An example structure of a DC busbar is illustrated in FIG. 8. With reference to FIG. 8, the DC busbar extends from a DC terminal (that is, a DC input terminal or a DC output terminal) connected to a bus capacitor C toward respective DC connection terminals of respective power modules according to the distances from the respective power modules to the DC terminal. Thus, although the DC busbar is wholly connected to the respective power modules, the parasitic inductances with respect to different power modules caused by the DC busbar are different, and such difference is taken into account in designing AC busbars.

Since a laminated busbar has an advantage of small parasitic inductance, DC busbars may employ a laminated busbar. The laminated busbar comprises multiple layers of laminated busbars. The present application preferably comprises two layers of busbars, wherein a layer of busbar is connected to a positive terminal of a power module, and another layer of busbar is connected to a negative terminal of the power module, insulation material being arranged between the two layers of the busbars. Since the DC busbar employing the laminated busbar has a small parasitic inductance, the AC busbar is designed with an also small parasitic inductance asymmetrical to that of the DC busbar. For a consideration of this design, it is required that the inductance differences between respective power modules are made small, which may be reached by a asymmetrical design of AC busbars.

Figure 5:
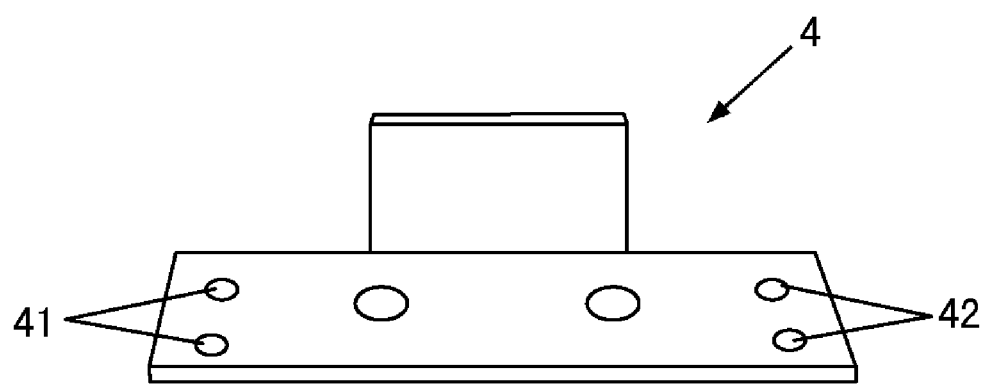
FIG. 5 is a schematic diagram showing an arrangement of an AC busbar with a symmetrical structure in the prior art.

FIG. 5 shows an AC busbar with a symmetrical structure. For the parasitic inductances with respect to the power module 1 and the power module 2 caused by this AC busbar are the same, which is not adapted to the present application.

Figure 6:
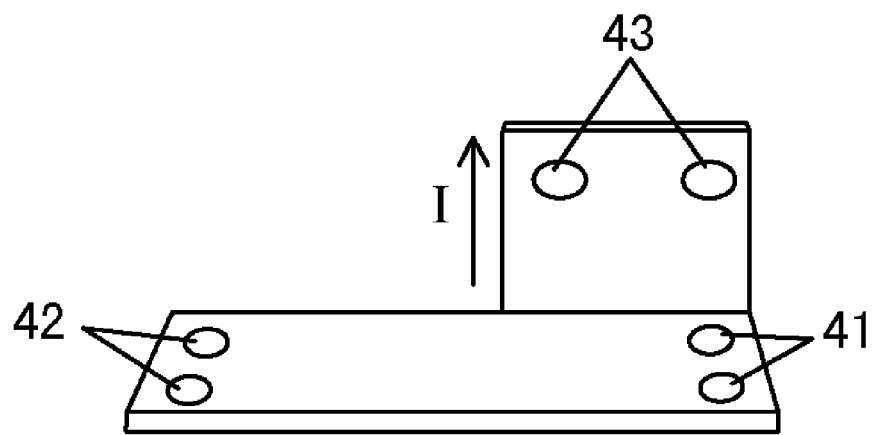
FIG. 6 is a schematic diagram showing an arrangement of an AC busbar with an asymmetrical structure according to an embodiment of the present application.
Figure 7:
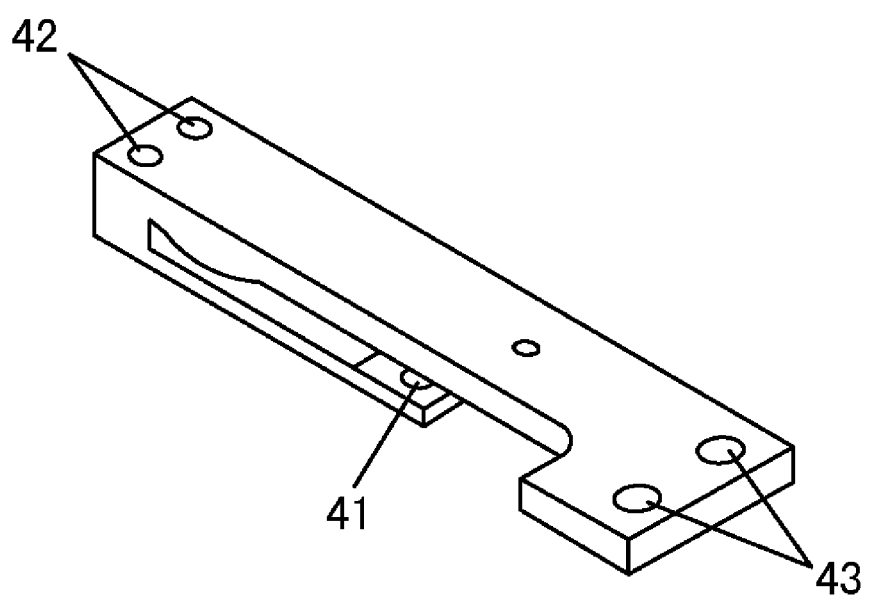
FIG. 7 is a schematic diagram showing an arrangement of an AC busbar with an asymmetrical structure according to another embodiment of the present application.

FIG. 6 shows an AC busbar with an asymmetrical structure according to an embodiment of the present application. As shown in FIG. 6, a distance from a terminal of the AC busbar connected to a load to the AC terminal of the power module 1 is different from that from the AC terminal of the power module 2, that is, the conductor of the connection terminal at a load side is deviated from the center position between the power module 1 and the power module 2, resulting in a difference between the parasitic inductances with respect to the power module 1 and the power module 2 respectively caused by the AC busbar, the size of the parasitic inductances is depends on the parasitic inductances with respect to the power module 1 and the power module 2 respectively caused by the DC busbar. FIG. 6 only exemplarily shows the terminal of the AC busbar connected to a load deviates farther from an AC connection terminal of the power module 2, however, the present application is not limited to this. The deviation manner can be designed according to the design manner of the DC busbar, as long as the effect of equalizing current can be achieved as a whole. FIG. 7 shows an AC busbar with an asymmetrical structure according to another embodiment of the present application. As shown in FIG. 7, the AC busbar is a bent U-shaped busbar, which extends from a terminal connected to a load toward a power module (for example, the power module 2 in this example) farthest from the terminal connected to a load, and is bent at an AC connection terminal of the farthest power module to sequentially extend toward AC connection terminals of other power modules (for example, the power module 1 in this example). Seen from FIG. 7, the upper and lower layers of the U-shaped AC busbar may reduce the whole parasitic inductance by a mutual inductance effect.

A whole assembly of a DC busbar and a AC busbar is illustrated in FIG. 8. In order to reach good current equalizing effect by an asymmetric design, a DC terminal of the DC busbar and a terminal of the AC busbar connected to a load are arranged at different sides. Moreover, according to a preferable embodiment, the respective power modules of the converter are arranged in parallel on the same plane in order to use a laminated busbar. Alternatively, the respective power modules can also be located in different planes.

When the converter is used for inverting a DC to a AC, the DC busbar introduces a DC into a DC connection terminal 32 of the power module 2, then into a DC connection terminal 31 of the power module 1, and an AC is outputted via the AC busbar after the DC is inverted. An AC connection terminal 43 of the AC busbar connected to a load is farther away from an AC connection terminal 42 of the power module 2, and is closer to an AC connection terminal 41 of the power module 1. This asymmetry design of the DC busbar and the AC busbar can achieve good current equalizing effect. Likewise, when the converter is used for rectifying an AC into a DC, the AC busbar introduces an AC from a terminal 43 connected to a load into the AC connection terminal 41 of the power module 1, then into the AC connection terminal 42 of the power module 2, and a DC is outputted to the DC busbar after the AC is rectified. In designing of current equalizing busbars of the present application, the DC busbar and the line-feeding direction thereof are firstly designed according to the requirement of system design, and an inductance difference of the DC busbar between power devices is obtained by simulation software. The dimensions of the AC busbar, such as thickness, are determined according to the direction and magnitude of the AC output, and hereafter, an inductance difference of the AC busbar between the power devices is changed by a manner such as adjusting space position and finely altering the size thereof. The above adjustment process can be obtained through simulation experiments. Eventually, the design is completed until the inductance difference caused by the AC busbar and the DC busbar can counteract each other or counteract to be within an acceptable error range.

The design idea of the present application is adapted to not only two power devices connected in parallel, but also more (more than two) power devices connected in parallel.

Figure 2:
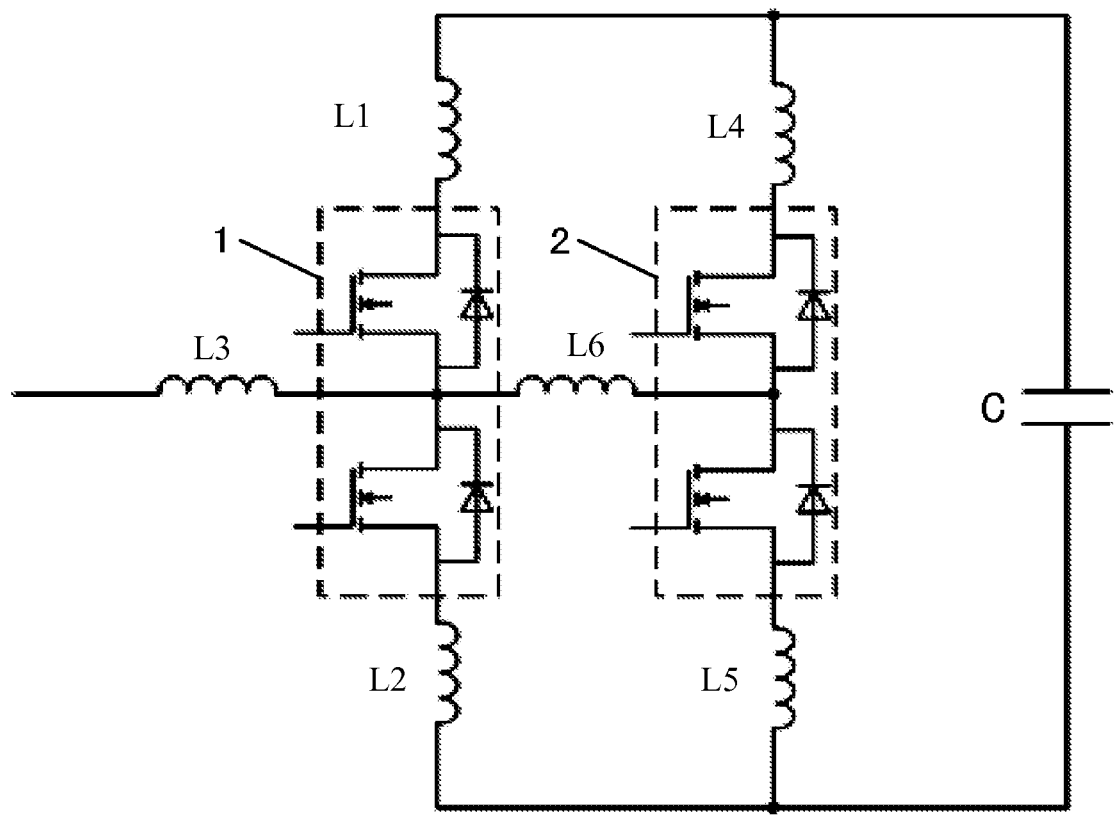
FIG. 2 is a diagram showing an equivalent circuit of DC busbars and AC busbars for a another converter in the prior art.
Figure 9:
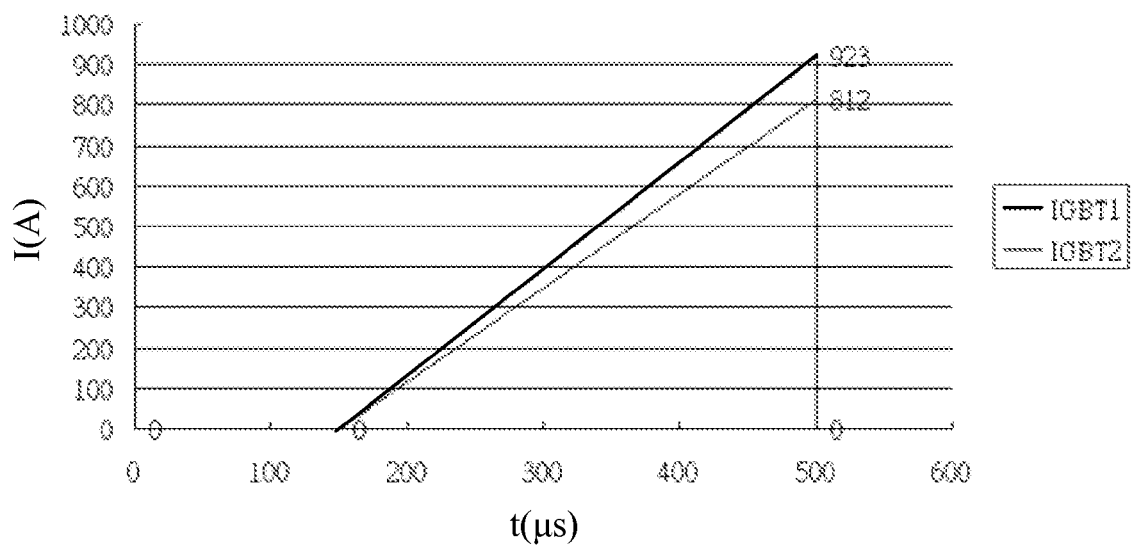
FIGS. 9 and 10 are digraphs respectively showing current equalizing effect of the AC busbar with the asymmetrical structure in FIG. 2 and a U-shaped AC busbar in FIG. 7.
Figure 10:
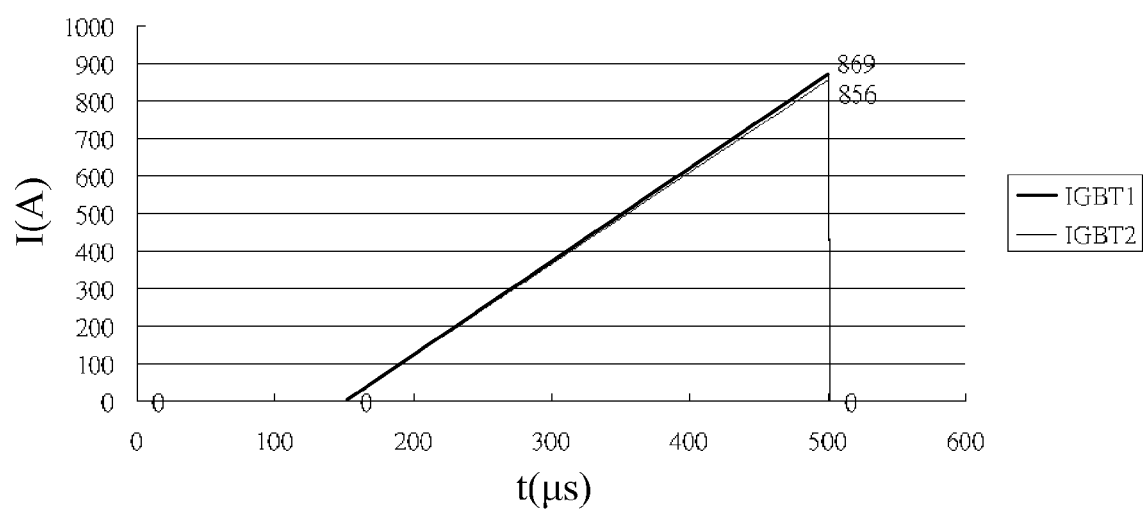

FIGS. 9 and 10 respectively show current equalizing effects of the AC busbar with the asymmetrical structure in FIG. 2 and the U-shaped AC busbar in FIG. 7 when the converter is used as an inverter. From FIG. 9, the current equalizing effect by this asymmetrical structure is not satisfactory, while from FIG. 10, the good current equalizing effect can be achieved by the compensation of the AC busbar and the DC busbar, wherein when the AC output is I=1100 A, the current imbalance between two power components (for example, IGBTs) is smaller than ±2%, thereby obtaining a good current equalizing. Further, the current equalizing effect where the U-shaped AC busbar is used is better in comparison with the AC busbar with the asymmetrical structure in FIG. 2.

According to the above embodiments, it can be seen that, although the current equalizing busbars according to the present application have a simple structure, a good current equalizing effect can be obtained, and the current equalizing busbars of the present application have a high reliability, and facilitate to system design. Thus, the current equalizing busbars of the present application may be widely applied to large power converters.

The embodiments were chosen and described in order to explain the principle of the application and their practical application so as to activate others skilled in the art to utilize the application, various embodiments and various modifications as are suited to the particular use contemplated. Alternative embodiments will become apparent to those skilled in the art to which the present application pertains without departing from its spirit and scope. Accordingly, the scope of the present application is defined by the appended claims rather than the foregoing description and the exemplary embodiments described therein.

What is claimed is:

1. A current equalizing busbar for a converter, comprising:
    a direct current busbar connected to a DC terminal of the converter and positive terminals and negative terminals of respective power modules in the converter; and
    an alternate current busbar connected to AC terminals of the respective power modules in the converter and a load;
    wherein, a sum of an inductance caused by a DC busbar between the DC terminal and a positive terminal or a negative terminal of a power module in the converter and an inductance caused by a AC busbar between the load and an AC terminal of the power module is equal to a sum of an inductance caused by the DC busbar between the DC terminal and positive terminals or negative terminals of other power modules and an inductance caused by the AC busbar between the load and AC terminals of said other power modules.

2. The current equalizing busbar according to claim 1, wherein the respective power modules are arranged side by side on a same plane.

3. The current equalizing busbar according to claim 1, wherein the DC busbar is a laminated busbar.

4. The current equalizing busbar according to claim 1, wherein the DC terminal is connected to a bus capacitor.

5. The current equalizing busbar according to claim 1, wherein the DC terminal and the load are respectively located at different sides of the converter.

6. The current equalizing busbar according to claim 1, the DC busbar extends from the DC terminal toward the positive terminals or the negative terminals of the respective power modules according to distances from the respective power modules to the DC terminal.

7. The current equalizing busbar according to claim 1, the AC busbar is a central asymmetric busbar, and a terminal of the central asymmetric busbar connected to the load is deviated from the center position among the AC terminals of the respective power modules.

8. The current equalizing busbar according to claim 1, wherein the AC busbar is a bent U-shaped busbar, and a terminal of the U-shaped busbar connected to the load extends to a power module in the converter farthest away from the terminal, and is bent at an AC terminal of the power module farthest away from the terminal so as to extending to AC terminals of other power modules.

9. The current equalizing busbar according to claim 1, the respective power modules comprise a first power module and a second power module.

10. The current equalizing busbar according to claim 9, a sum of an inductance caused by the DC busbar between the DC terminal and a positive terminal or a negative terminal of the first power module in the converter and an inductance caused by the AC busbar between the load and an AC terminal of the first power module is equal to a sum of an inductance caused by the DC busbar between the DC terminal and a positive terminal or a negative terminal of the second power module and an inductance caused by the AC busbar between the load and an AC terminal of the second power module.

* * * * *